United States Patent [19]

Tanaka

[11] Patent Number: 4,674,026
[45] Date of Patent: Jun. 16, 1987

[54] DELTA-CONNECTED CIRCULATING CURRENT CYCLOCONVERTER APPARATUS

[75] Inventor: Shigeru Tanaka, Tokyo, Japan

[73] Assignee: Kabushiki Kaisha Toshiba, Kawasaki, Japan

[21] Appl. No.: 636,022

[22] Filed: Jul. 30, 1984

[30] Foreign Application Priority Data

Aug. 12, 1983 [JP] Japan ................................ 58-146557
Aug. 12, 1983 [JP] Japan ................................ 58-146560

[51] Int. Cl.⁴ ........................ H02M 5/257; G05F 1/70
[52] U.S. Cl. .................................. 363/160; 318/729; 323/207
[58] Field of Search ............... 318/800, 729; 323/207; 363/9, 10, 160, 161

[56] References Cited

U.S. PATENT DOCUMENTS 4,013,937  3/1977  Pelly et al. .................... 323/207

FOREIGN PATENT DOCUMENTS

58-60328  4/1983  Japan ................................ 323/207
58-58621  4/1983  Japan ................................ 323/207

Primary Examiner—William H. Beha, Jr.
Attorney, Agent, or Firm—Oblon, Fisher, Spivak, McClelland & Maier

[57] ABSTRACT

A cycloconverter apparatus has three sets of AC/DC converters which are coupled to a 3-phase load and are connected in a delta fashion to form a circulating current type cycloconverter. Load currents to be supplied to the 3-phase load are controlled by a load current control circuit. Reactive power at the power supply side of the cycloconverter is detected by a reactive power detector. The sum of output currents from the converters is controlled by a current sum control circuit in accordance with a detected signal from the reactive power detector. The triggering phase of each of the converters is controlled by output signals from the load current control circuit and from the current sum control circuit. The controlled subject is the sum of the converter output currents, and the load currents are controlled directly.

11 Claims, 15 Drawing Figures

DELTA-CONNECTED CIRCULATING CURRENT CYCLOCONVERTER APPARATUS

BACKGROUND OF THE INVENTION

The present invention relates to an improvement of a delta-connected cycloconverter which optionally controls the power factor of a fundamental wave at the power supply side.

A conventional cycloconverter providing for a single phase is formed of a pair of positive and negative converters. When such a conventional cycloconverter is utilized to constitute a 3-phase power supply apparatus, three cycloconverters of six converters (i.e., three positive converters and three negative converters) are necessary. On the other hand, such a 3-phase power supply apparatus may be formed of a delta-connected cycloconverter. A delta-connected cycloconverter is a variable frequency AC power supply apparatus for a 3-phase load, in which the three AC/DC power converters are connected in a delta fashion. A delta-connected cycloconverter is advantageous in that the number (3) of converters required is half of the number (6) of converters used in a conventional 3-phase cycloconverter apparatus. From this, a delta-connected cycloconverter becomes the center of the attention of a skilled person in the art (cf. Japanese Patent Application No. 56-158,692 or U.S. patent application Ser. No. 594,917 filed on Mar. 29, 1984).

Figure 1:
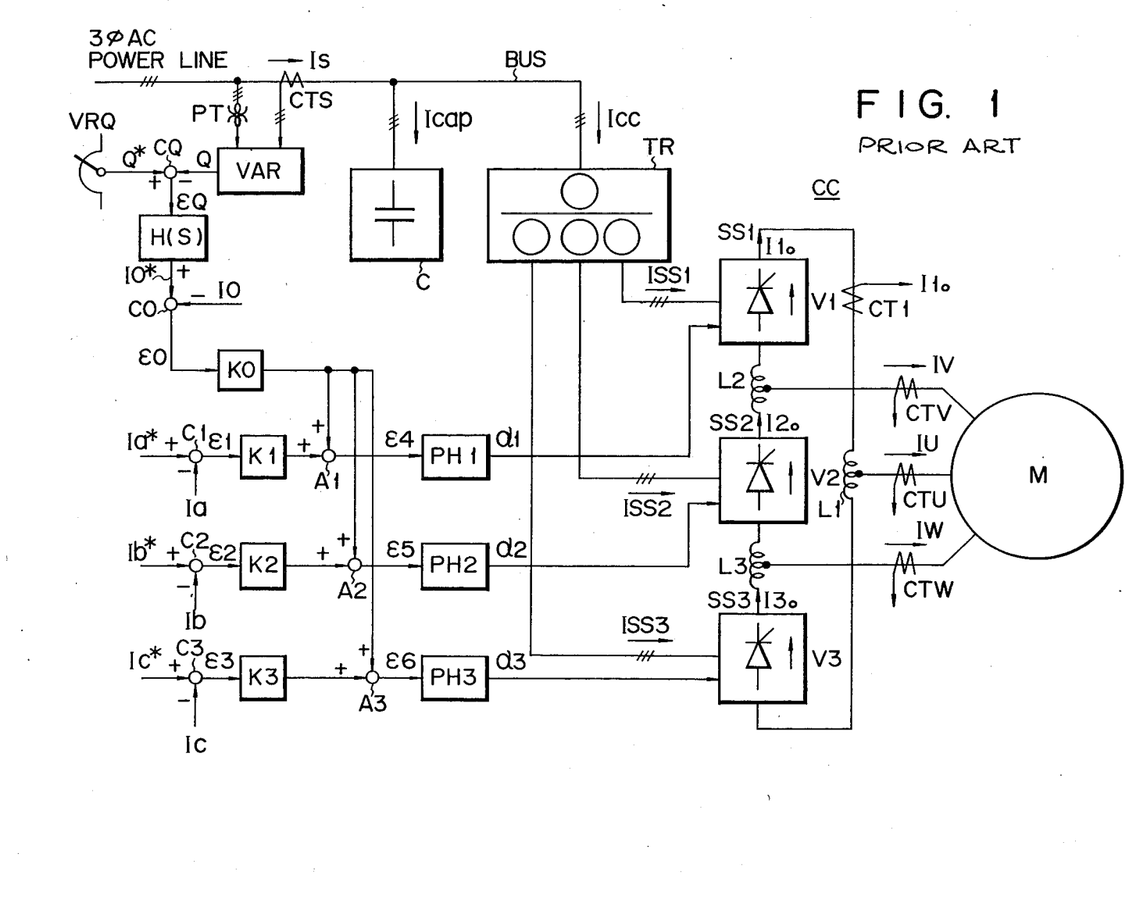
FIG. 1 is a block diagram of a reactive power control cycloconverter, which shows a background art of the present invention.

FIG. 1 shows a delta-connected cycloconverter and is the ame as FIG. 3 of said Japanese Patent Application No. 56-158,692 or U.S. patent application Ser. No. 594,917. (All disclosures of this U.S. patent application are incorporated in the present application). In FIG. 1, symbol BUS denotes power supply lines for a 3-phase AC. Symbol C denotes a phase advancing capacitor; TR denotes a power transformer; CC denotes the main unit of a delta-connected 3-phase-output cycloconverter; and M denotes a 3-phase AC motor (load). The main unit of cycloconverter CC is formed of three sets of AC/DC power converters SS1, SS2 and SS3 which are associated with DC reactors L1, L2 and L3 having center taps. The AC inputs of converters SS1, SS2 and SS3 are isolated from one another by power transformer TR. The DC outputs of converters SS1, SS2 and SS3 are delta-connected via reactors L1, L2 and L3, so that a unidirectional DC circulating current flows. A cycloconverter having such a configuration is generally called "a triangular or delta-connected circulating current type cycloconverter." The 3-phase windings of motor M are respectively connected to the corresponding center taps of DC reactors L1, L2 and L3.

In the configuration of FIG. 1, a control circuit for cycloconverter CC comprises a current transformer CTS for detecting 3-phase AC currents at the input side (power supply side) of CC, a voltage transformer PT for detecting 3-phase AC voltages, a reactive power arithmetic circuit VAR, a control compensator H(S), a reactive power setting potentiometer VR, comparators CQ, C0, C1, C2 and C3, adders A1, A2 and A3, oerational amplifiers K0, K1, K2 and K3, phase control circuits PH1, PH2 and PH3, and current transformers CTU, CTV and CTW for detecting the load currents.

The control operation for the load currents will be described below.

Figure 2:
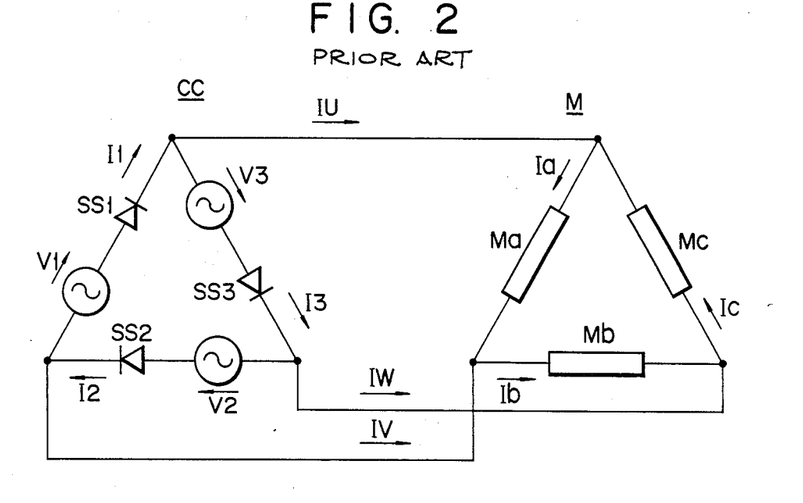
FIG. 2 shows an equivalent circuit of a cycloconverter main unit and load (motor M) in FIG. 1.

FIG. 2 shows an equivalent circuit for cycloconverter main unit CC and motor M in FIG. 1. In the equivalent circuit, motor M has windings Ma, Mb and Mc which are connected in delta fashion. (The delta-connection can be equivalently converted to a Y-connection.) Symbols V1, V2 and V3 respectively represent output voltages from converters SS1, SS2 and SS3. Although output currents I1, I2 and I3 respectively from converters SS1, SS2 and SS3 flow only in a given single direction, the polarity of each of output voltages V1, V2 and V3 may be positive or negative.

Currents Ia, Ib and Ic of the motor windings flow in directions as illustrated (counterclockwise direction in the closed loop of the delta-connection) and have the following relations with line currents IU, IV and IW:

$$Ia = (IU - IV)/3 \quad (1)$$

$$Ib = (IV - IW)/3 \quad (2)$$

$$Ic = (IW - IU)/3 \quad (3)$$

A set of currents IU, IV and IW and a set of currents Ia, Ib and Ic are generally 3-phase sinusoidal currents.

Figure 3A:
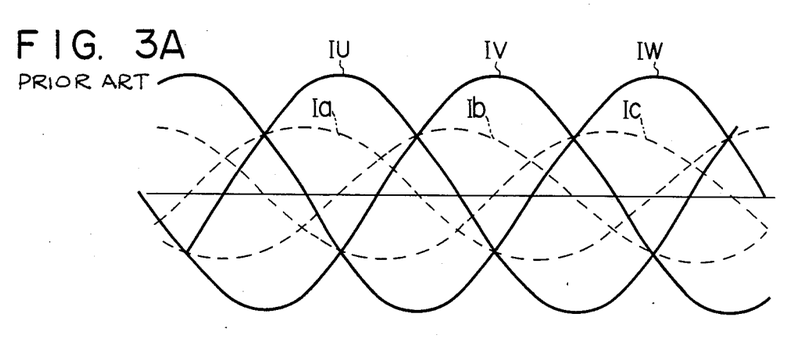
FIGS. 3A to 3D show waveforms of the signals in the equivalent circuit shown in FIG. 2.
Figure 3B:
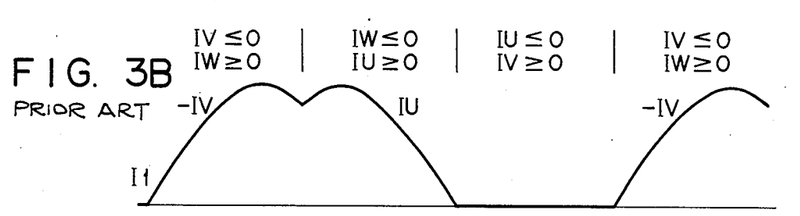
Figure 3C:
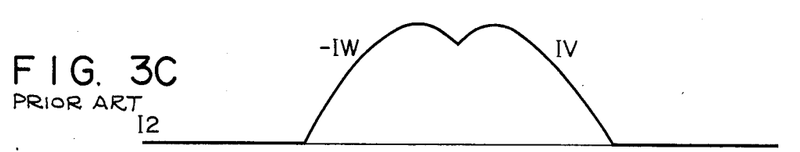
Figure 3D:
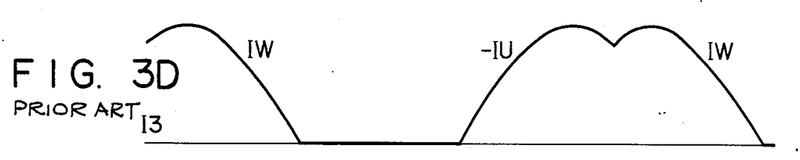

FIGS. 3A to 3D show waveforms of the currents in the equivalent circuit of FIG. 2. Currents Ia, Ib and Ic respectively satisfy equations (1), (2) and (3) with respect to line currents IU, IV and IW. Currents I1, I2 and I3 outputted from converters SS1, SS2 and SS3 flow only in the positive direction, and they change in accordance with values of line currents IU, IV and IW as illustrated in FIGS. 3B to 3D. As for the values of output currents I1, I2 and I3, the following three modes may be considered.

Mode I: $IV \leq 0$ and $IW \geq 0$

In this mode, output current I2 from converter SS2 becomes zero, and $I1 = -IV$ and $I3 = IW$ are obtained.

Mode II: $IW \geq 0$ and $IU \geq 0$

In this mode, output current I3 from converter SS3 becomes zero, and $I1 = IU$ and $I2 = -IW$ are obtained.

Mode III: $IU \leq 0$ and $IV \geq 0$

In this mode, output current I1 from converter SS3 becomes zero, and $I2 = IV$ and $I3 = -IU$ are obtained.

Incidentally, when circulating current Io flows, the amount of each of output currents I1, I2 and I3 is changed by the amount of Io.

As is apparent from the equivalent circuit of FIG. 2, when output voltages from converters SS1, SS2 and SS3 are kept in a balanced 3-phase state, the following voltage equations are established:

$$V1 = (Ra + La \cdot p) \cdot Ia + Ea \quad (4)$$

$$V2 = (Rb + Lb \cdot p) \cdot Ib + Eb \quad (5)$$

$$V3 = (Rc + Lc \cdot p) \cdot Ic + Ec \quad (6)$$

where Ra, Rb and Rc are the resistances of windings Ma, Mb and Mc of motor M, respectively; La, Lb and Lc are inductances of windings Ma, Mb and Mc, respectively; Ea, Eb, and Ec are counter electromotive forces from windings Ma, Mb and Mc, respectively; and p is the differentiation operator ($= d/dt$).

Equations (4) to (6) indicate that voltages V1, V2 and V3 can be respectively used to control the currents Ia, Ib and Ic.

The control operation for currents Ia, Ib and Ic will be as follows.

Referring again to FIG. 1, line currents IU, IV and IW are detected by current transformers CTU, CTV and CTW, respectively, and equations (1), (2) and (3) are calculated to obtain the value of each of phase currents Ia, Ib and Ic. A circuit for obtaining these phase currents may be one as shown in FIG. 3A of said U.S. patent application Ser. No. 594,917. The obtained currents Ia, Ib and Ic are supplied to comparators C1, C2 and C3 and are compared with specific phase current instructions Ia*, Ib* and Ic*, respectively. Differences $\epsilon 1 = Ia^* - Ia$, $\epsilon 2 = Ib^* - Ib$ and $\epsilon 3 = Ic^* - Ic$ are respectively obtained from comparators C1, C2 and C3, and these differences are amplified by amplifiers K1, K2 and K3, respectively. Amplified signals from amplifiers K1, K2 and K3 are supplied to phase control circuits PH1, PH2 and PH3, respectively.

When a relation $Ia < Ia^*$ holds, the value $\epsilon 1 \cdot K1$ increases and output voltage V1 from converter SS1 increases. Then, phase current Ia in equation (4) increases, and the control operation is effected to finally obtain the target $Ia = Ia^*$. On the other hand, when $Ia > Ia^*$ holds, $\epsilon 1 \cdot K1$ decreases and output voltage V1 also decreases. Then, current Ia decreases to establish the relation $Ia = Ia^*$.

Similarly, control is performed to obtain the targets $Ib = Ib^*$ and $Ic = Ic^*$.

When currents Ia, Ib and Ic are controlled in the form of 3-phase sinusoidal currents as shown by broken lines in FIG. 3A, line currents IU, IV and IW or the input currents of motor M become 3-phase balanced sinusoidal currents having waveforms shown by solid lines in FIG. 3A.

The operation of reactive power control at the power supply side of the cycloconverter in FIG. 1 will be described.

Current transformer CTS and voltage transformer PT are arranged at the power supply side. Reactive power arithmetic circuit VAR calculates reactive power Q. Circuit VAR may be one as shown in FIG. 13 of said U.S. patent application Ser. No. 594,917. Specified value (reactive power instruction) Q* of the reactive power is normally set to be zero. Comparator CQ receives Q* and Q and generates their difference $\epsilon Q (= Q^* - Q)$. Control compensator H(S) may be formed of an integration or integration/proportion element. The integration element serves to nullify the steady value of different $\epsilon Q$. An output Io* from compensator H(S) is used as the specified value (instruction) of circulating current Io. Comparator C0 receives Io* and Io and provides their difference $\epsilon o (= Io^* - Io)$. Difference $\epsilon o$ is supplied to adders A1, A2 and A3 via amplifier K0. Then, inputs $\epsilon 4$, $\epsilon 5$ and $\epsilon 6$ for phase control circuits PH1, PH2 and PH3 are obtained, respectively, as follows:

$$\epsilon 4 = \epsilon 1 \cdot K1 + \epsilon 0 \cdot K0 \qquad (7)$$

$$\epsilon 5 = \epsilon 2 \cdot K2 + \epsilon 0 \cdot K0m \qquad (8)$$

$$\epsilon 6 = \epsilon 3 \cdot K3 + \epsilon 0 \cdot K0 \qquad (9)$$

Each of output voltages V1, V2 and V3 from respective converters SS1, SS2 and SS3 is increased by a DC bias voltage having a value of $\epsilon 0 \cdot K0$, so that circulating current Io actually flows through DC reactors L1, L2 and L3.

When circulating current Io exceeds the specified value of instruction Io, difference $\epsilon 0 (= Io - Io)$ becomes negative and voltages V1, V2 and V3 are reversely DC-biased to decrease the current Io. Control is performed to finally establish the target relation $Io = Io^*$, and the DC bias voltage becomes substantially zero if the resistance components of DC reactors L1, L2 and L3 are negligibly low.

In the steady state wherein $Io = Io^*$ is established, output voltages V1, V2 and V3 from the respective converters are balanced, so that $$V1 + V2 + V3 = 0 \qquad (10)$$

Circulating current Io is reactive and flows independently to the active component of an input current Icc of the cycloconverter. Thus, when measured from the power supply side, circulating current Io of the cycloconverter has no effect to increase/decrease of the active power.

Circulating current Io is controlled such that the sum of a phase-delayed reactive power caused by load currents IU, IV and IW and a phase-advancing reactive power caused by circulating current Io becomes equal to a phase-advancing reactive power caused by phase advancing capacitor C which is connected to the power supply side (input side) of the cycloconverter. By doing so, the fundamental wave power factor at the cycloconverter input can be made "1".

When the specified value of instruction Q* is smaller than detected value Q of the reactive power at the power supply side of the cycloconverter, difference $\epsilon Q (= Q^* - Q)$ becomes positive so that instruction Io* for the circulating current from control compensator H(S) increases. From this, actual circulating current Io increases, and value Q of the reactive power (phase-delayed) also increases. Finally, the target relation $Q = Q^*$ is stably established. However, if $Q > Q^*$, inequality $\epsilon Q < 0$ is given and Io* decreases. Then, in the same manner as described above, control is performed to establish the relation $Q = Q^*$. When the specified value of instruction Q* is set to be zero, $Q = 0$ is given so that the fundamental wave power factor at the cycloconverter input is controlled to be "1".

FIGS. 4A to 4E jointly show a timing chart wherein circulating current Io flows in the apparatus of FIG. 1. Reference symbol $I1_o$ denotes output current from converter SS1; SG1, SG2 and SG3 respectively denote signals representing the positive or negative states of line currents IU, IV and IW; and SW1, SW2 and SW3 respectively denote the logical results for signals SG1, SG2 and SG3.

Figure 4E:
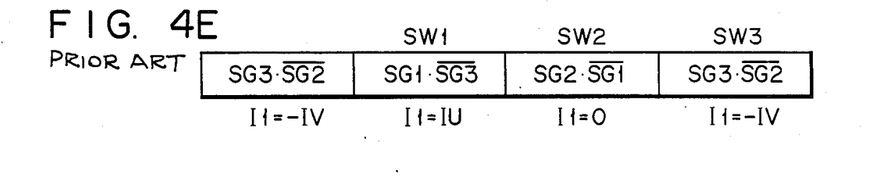
Figure 5:
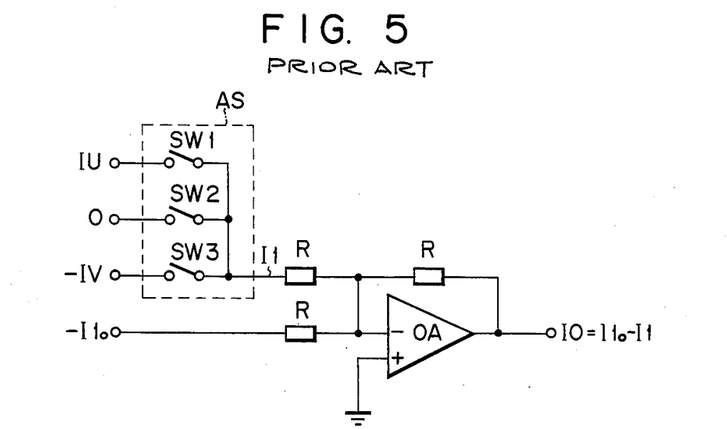
FIG. 5 shows a circuit configuration of a detector for detecting the circulating current Io.

FIG. 5 shows a circuit configuration of a detector for detecting circulating current Io. An inverting operational amplifier OA being provided with resistors R at its NF branch has a gain of $-1$. Analog switch AS includes three switches SW1, SW2 and SW3 which are turned on and off in response to logical results SW1, SW2 and SW3 of FIG. 4E.

Figure 4A:
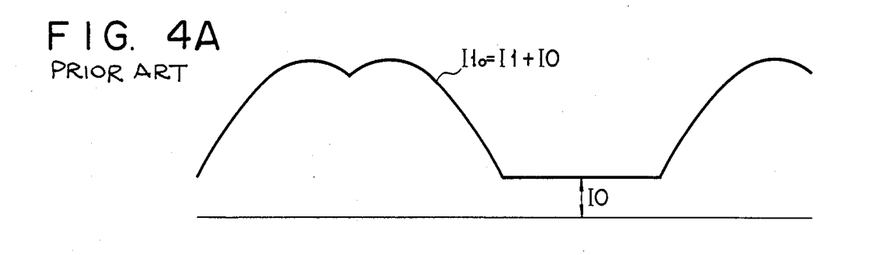
FIGS. 4A to 4E are timing charts explaining an operation of FIG. 1 in case where a circulating current Io flows.

As seen from FIG. 4A, output current $I1_o$ from converter SS1 is a sum of circulating current Io and current I1 which is defined by line currents IU and IV (FIG. 3B). Current $I1_o$ has the following three modes:

(1) $I1_o = IU + Io$ for $IW \leq 0$ and $IU \geq 0$
(2) $I1_o = Io$ for $IU \leq 0$ and $IV \geq 0$
(3) $I1_o = -IV + Io$ for $IV \leq 0$ and $IW \geq 0$ When signals SG1, SG2 and SG3 indicate the conditions that $IU \geq 0$, $IV \geq 0$ and $IW \geq 0$, respectively, the following logic operation is performed to obtain the logical results (signals) SW1, SW2 and SW3 as follows:

(1) signal SW1=SG1·SG3
(2) signal SW2=SG2·SG1
(3) signal SW3=SG3·SG2
when the detected value of line current IU, the value of zero volt and the inverted detected value of line current IV are respectively supplied to switches SW1, SW2 and SW3 of analog switch AS in FIG. 5, switches SW1, SW2 and SW3 can be turned on and off in accordance with signals SW1, SW2 and SW3. Then, the value of output current I1 from converter SS1, which is free from the value of circulating current Io, can be obtained. The obtained value of output current I1 is subtracted from actual output current $I1_o$ produced from converter SS1, thereby obtaining the circulating current Io (i.e., $Io = I1_o - I1$).

Figure 4B:
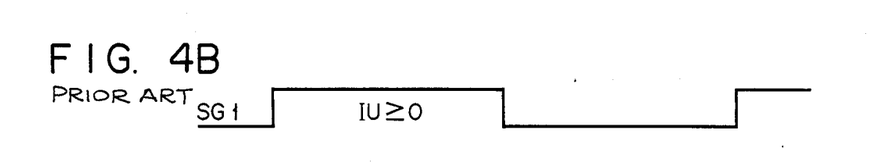
Figure 4C:
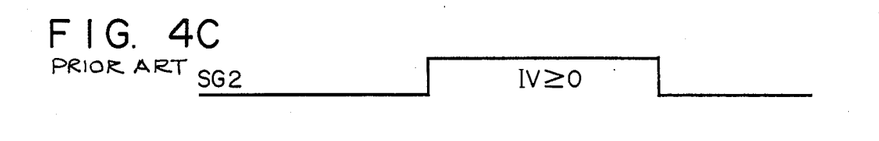
Figure 4D:
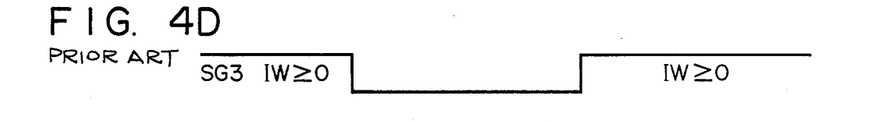

The cycloconverter of FIG. 1 involves the following problems:

(a) The necessity for detecting the circulating current Io of the cycloconverter requires a special logic operation as indicated in FIG. 4E. In practice, however, it is difficult to obtain precise signals SG1, SG2 and SG3 as indicated in FIGS. 4B to 4D, each of which should accurately indicate the positive/negative polarity of line currents IU, IV and IW. To be concrete, pulsate components of currents IU, IV and IW retard a precise detection for signals SG1, SG2 and SG3, resulting in degrading the detection accuracy of circulating current Io. Although a special device which precisely detects the circulating current could be designed, such a device would become complex, expensive and low in reliability.

(b) The control for the circulating current Io of the cycloconverter is performed in accordance with the circulating current instruction Io* from a reactive power control circuit. The circulating current control circuit detects the circulating current Io from actual load currents IU, IV and IW. These load currents generally involve noises etc., and such noises will cause disturbance on the circulating current control operation. This disturbance prevents a precise control for obtaining the control target Io=Io*, resulting in lowering the control accuracy for reactive power at the power supply side of the cycloconverter. Thus, a special circulating current control circuit, which should be designed to avoid the above disturbance, is required.

(c) The relation of equations (1) to (3) between the phase currents Ia, Ib and Ic and the line currents IU, IV and IW should exactly hold when a load current control is to be accurate. However, a circulating current flowing through windings Ma, Mb and Mc of motor M (load) breaks the exact relation of equations (1) to (3). Thus, the circulating current could worsen the control accuracy for actual load currents IU, IV and IW.

(d) The load current control operation does not directly access the actual load currents IU, IV and IW. Therefore, there is no assurance that the actual load currents are accurately controlled. In other words, the exact value of actual load currents is not known. From this, reliability in the torque control and speed control of motor M is low. Further, the fact that the exact value of the actual load currents is unknown is a serious problem when a vector control method for an induction motor is applied to the cycloconverter.

(e) In a delta-connected cycloconverter system, 3-phase power is supplied via three power supply lines to a load. In this case, load currents of two phases automatically define the remaining phase load current. Despite, a conventional load current control system performs independent control for the respective three phases. When all load currents of three phases are independently controlled, mutual interferences among three independent load current control circuits could cause an undesirable oscillation and spoil the normal operation of the control system.

SUMMARY OF THE INVENTION

It is accordingly the object of the present invention to provide a delta-connected cycloconverter which can control, without depending on a circulating current detection, reactive power at the power supply side of the cycloconverter, and which is substantially free from disturbance from actual load currents.

Another object of the invention is to provide a delta-connected cycloconverter which can directly control actual load currents of the cycloconverter without mutual interferences among load current control circuits.

To achieve the former object a cycloconverter of the invention has at least three sets of AC/DC converters which are coupled to a 3-phase load and are connected in a delta fashion to form a circulating current type cycloconverter. Load currents to be supplied to the 3-phase load are controlled by a load current control circuit. Reactive power at the power supply side of the cycloconverter is detected by reactive power detecting means. The sum of output currents from the converters (or the sum of the load currents) is controlled by a current sum control circuit according to a detected signal from the reactive power detecting means. The triggering phase of each of the converters is controlled in accordance with output signals from the load current control circuit and from the current sum control circuit. According to the present invention, the controlled subject is a sum of the converter output currents, not a circulating current. Therefore, the said problems (a) and (b) caused by the necessity of detecting the circulating current are resolved.

To achieve the latter object, in a delta-connected cycloconverter according to the present invention, two phase currents IU and IV of the three phase currents are detected. The detected value of currents IU and IV are respectively compared with the corresponding instruction values IU* and IV* to obtain differences $\epsilon U = IU^* - IU$ and $\epsilon V = IV^* - IV$. The delta-connected cycloconverter comprises a first power converter SS1, second power converter SS2 and third power converter SS3. The output voltage of first converter SS1 is controlled in accordance with the value of a difference $\epsilon U - \epsilon V$. The output voltage of second converter SS2 is controlled in accordance with the value of a sum $2\epsilon V + \epsilon U$. The output voltage of third converter SS3 is controlled in accordance with the value of a negative sum $-(2\epsilon U + \epsilon V)$.

According to the present invention, the actual load currents IU, IV and IW can be controlled directly and independently.

DETAILED DESCRIPTION OF THE PREFERRED EMBODIMENT

Figure 6:
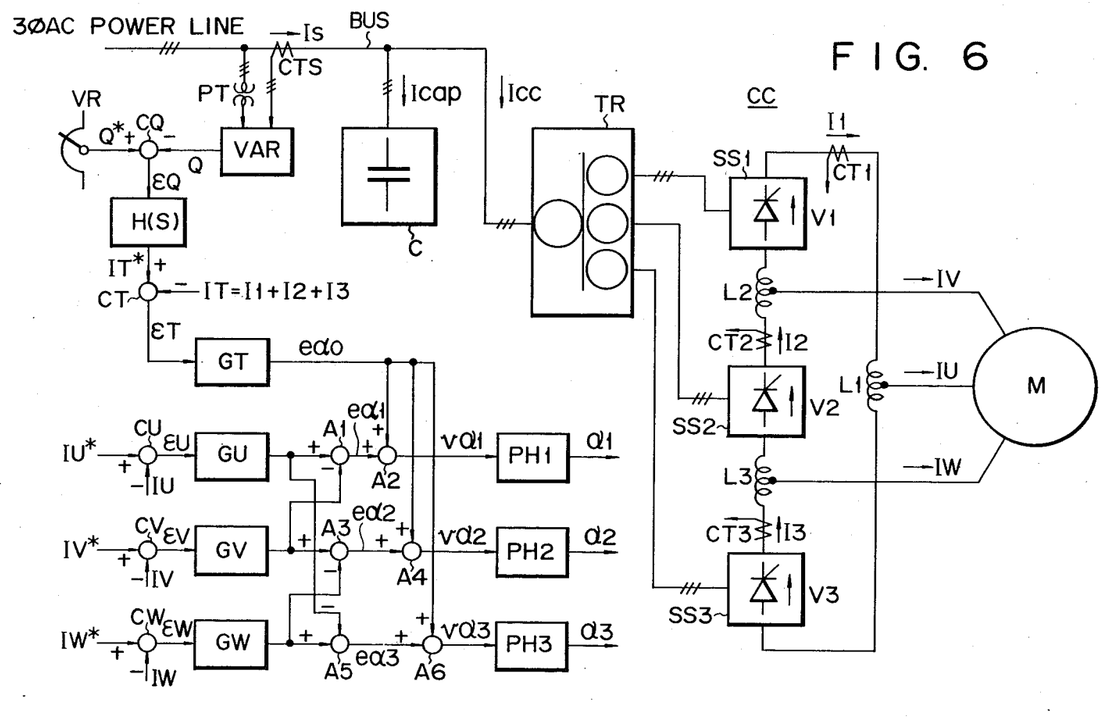
FIG. 6 shows a block diagram of a cycloconverter according to an embodiment of the present invention.

FIG. 6 shows a block diagram of a cycloconverter according to an embodiment of the present invention.

Referring to FIG. 6, reference symbol BUS denotes power lines of a 3-phase AC power supply; C denotes a delta- or Y-connected phase advancing capacitor; TR denotes a power transformer; CC denotes a 3-phase-output cycloconverter main unit; and M denotes a 3-phase AC motor (load). Cycloconverter main unit CC includes three AC/DC power converters SS1, SS2 and SS3, and DC reactors L1, L2 and L3 with center taps. The AC input terminals of converters SS1, SS2 and SS3 are insulated from one another by power transformer TR. The DC terminals of converters SS1, SS2 and SS3 are delta-connected via DC reactors L1, L2 and L3, so that a unidirectional circulating current flows in a closed loop which is formed by the delta connection of converters SS1, SS2 and SS3. Thus, a delta-connected circulating current type cycloconverter is obtained. The center taps of DC reactors L1, L2 and L3 are connected to 3-phase windings of motor M.

A control circuit for the above circulating current type cycloconverter includes a current transformer CTS for detecting 3-phase AC currents at the power supply side of the cycloconverter; a voltage transformer PT for detecting the 3-phase AC voltage; a reactive power arithmetic circuit VAR; a reactive power control compensator H(S) containing an integration or integration/proportion element; a reactive power setting potentiometer VR; comparators CQ, CT, CU, CV and CW; adders A1 to A6, current control compensators GT, GU, GV and GW; phase control circuits PH1, PH2 and PH3; and current transformers CT1, CT2 and CT3.

Now, explanation will be given to the operation of the load current control.

Output currents I1, I2 and I3 from converters SS1, SS2 and SS3 are detected by current transformers CT1, CT2 and CT3, respectively. The detected values of currents I1, I2 and I3 are supplied to a current converter (not shown) which is formed of conventional subtracter circuits. Each of these subtracter circuits performs given subtracting operation to provide the following load current detected values IU, IV and IW:

$$IU = I1 - I3 \tag{11}$$

$$IV = I2 - I1 \tag{12}$$

$$IW = I3 - I2 \tag{13}$$

Or, these values may be directly obtained by detecting the load currents IU, IV and IW.

Load current detected values IU, IV and IW are supplied to comparators CU, CV and CW, respectively.

Comparator CU compares the value IU with an instruction value IU* for load current IU and provides an error $\epsilon U = IU^* - IU$. Comparator CV compares the value IV with an instruction value IV* for load current IV and provides an error $\epsilon V = IV^* - IV$. Comparator CW compares the value IW with an instruction value IW* for load current IW and provides an error $\epsilon W = IW^* - IW$. Error $\epsilon U$ from comparator CU is supplied via current control compensator GU to the positive input of adder A1 and to the negative input of adder A5. Error $\epsilon V$ from comparator CV is supplied via current control compensator GV to the positive input of adder A3 and to the negative input of adder A1. Error $\epsilon W$ from comparator CW is supplied via current control compensator GW to the positive input of adder A5 and to the negative input of adder A3. Then, the following control signals $e\alpha 1$, $e\alpha 2$ and $e\alpha 3$ are obtained from adders A1, A3 and A5, respectively:

$$e\alpha 1 = GU \cdot \epsilon U - GV \cdot \epsilon V \tag{14}$$

$$e\alpha 2 = GV \cdot \epsilon V - GW \cdot \epsilon W \tag{15}$$

$$e\alpha 3 = GW \cdot \epsilon W - GU \cdot \epsilon U \tag{16}$$

The circuit constant of each of the current control compensators GU, GV and GW is properly selected, so that $$GU = GV = GW = G(S) \tag{17}$$

holds. Equations (14) to (16) can be simplified by equation (17) as:

$$e\alpha 1 = (\epsilon U - \epsilon V) \cdot G(S) \tag{18}$$

$$e\alpha 2 = (\epsilon V - \epsilon W) \cdot G(S) \tag{19}$$

$$e\alpha 3 = (\epsilon W - \epsilon U) \cdot G(S) \tag{20}$$

Control signals $e\alpha 1$, $e\alpha 2$ and $e\alpha 3$ are supplied to adders A2, A4 and A6, respectively. Each of adders A2, A4 and A6 receives a signal $e\alpha 0$ (which will be mentioned later) from current control compensator GT. Then, adder A2 supplies the phase control circuit PH1 with a signal $v\alpha 1$ corresponding to $e\alpha 1 + e\alpha 0$. Adder A4 supplies the phase control circuit PH2 with a signal $v\alpha 2$ corresponding to $e\alpha 2 + e\alpha 0$. Adder A6 supplies the phase control circuit PH3 with a signal $v\alpha 3$ corresponding to $e\alpha 3 + e\alpha 0$.

For the sake of simplciity, the following description will be given to a case wherein the value of $e\alpha 0$ is zero.

In a 3-phase 3-line load, a relation "IU+IV+IW=0" always holds. Accordingly, instructions IU*, IV* and IW* are preselected to satisfy the relation "IU*+IV*+IW*=0." Then, current errors $\epsilon U$, $\epsilon V$ and $\epsilon W$ for respective phases satisfy the following relation:

$$\epsilon U + \epsilon V + \epsilon W = 0 \tag{21}$$

For instance, when $\epsilon U = 2$ and $\epsilon V = 1$ are given, $\epsilon W$ is selected to be $-3$. In this case, an output voltage V1 from converter SS1 increases in proportion to the value of $(\epsilon U - \epsilon V) = 1$, an outut voltage V2 from converter SS2 increases in proportion to the value of $(\epsilon V - \epsilon W) = 4$, and an output voltage V3 from converter SS3 decreases in proportion to the value of $(\epsilon W - \epsilon U) = -5$. The circuit arrangement of the cycloconverter CC and motor M in FIG. 6 may be represented by the equivalent circuit of FIG. 2. Then, phase current Ia increases in proportion to the increment "1"

of voltage V1, phase current Ib increases in proportion to the increment "4" of voltage V2, and phase current Ic decreases in proportion to the decrement "−5" of voltage V3.

The load currents (line currents) IU, IV and IW and the phase currents Ia, Ib and Ic have the following relations:

$$IU = Ia - Ic \quad (22)$$

$$IV = Ib - Ia \quad (23)$$

$$IW = Ic - Ib \quad (24)$$

Equations (22) to (24) are established whether or not the circulating current flows in the delta-connected load. Therefore, when Ia is increased in proportion to "1", Ib is increased in proportion to "4" and Ic is decreased in proportion to "−5"; IU correspondingly increases by "6", IV correspondingly increases by "3", and IW correspondingly decreases by "−9". The increment-/decrement components $\Delta IU$, $\Delta IV$ and $\Delta IW$ have the following relations:

$$\Delta IU = \text{"6"} \propto \epsilon U = \text{"2"}$$

$$\Delta IV = \text{"3"} \propto \epsilon V = \text{"1"}$$

$$\Delta IW = \text{"}-9\text{"} \propto \epsilon W = \text{"}-3\text{"}$$

Thus, these components $\Delta IU$, $\Delta IV$ and $\Delta IW$ are proportional to errors $\epsilon U$, $\epsilon V$ and $\epsilon W$. Load currents IU, IV and IW can be directly controlled according to these errors $\epsilon U$, $\epsilon V$ and $\epsilon W$.

Now description will be given to the operation of a reactive power control at the power supply side of cycloconverter CC.

As shown in FIG. 6, currents at the power supply side are detected by current transformer CTS, and the power supply voltage is detected via voltage transformer PT. From the detected values of currents and voltage, reactive power Q at the power supply side of cycloconverter CC is calculated by reactive power arithmetic circuit VAR. An instruction value Q* for reactive power Q, which is supplied from reactive power setting potentiometer VR, is generally set at zero. An error $\epsilon Q = Q^* - Q$ is obtained from comparator CQ. Error $\epsilon Q$ is supplied to reactive power control compensator H(S). Compensator H(S) includes an integration element which serves to render the steady value of error $\epsilon Q$ zero. Compensator H(S) provides an instruction IT* which is the control target of the current sum of I1, I2 and I3 from converters SS1, SS2 and SS3.

Instruction IT* is supplied to comparator CT which also receive a detected current sum IT. Current sum IT may be obtained by simply adding detected output currents I1, I2 and I3 respectively from current transformers CT1, CT2 and CT3. Comparator CT compares the current sum IT with the instruction IT* and generates an error $\epsilon T = IT^* - IT$. The generated error $\epsilon T$ is supplied to current control compensator GT which is generally formed of integration and/or proportion element. In the following description, for the sake of simplicity, it is assumed that the compensator GT is simply formed of a proportion element having a multiplication factor KT. Compensator GT supplies a multiplied error $KT \cdot \epsilon T$ to each of adders A2, A4 and A6.

A typical reactive power control operation is as follows.

When IT*>IT, error $\epsilon T$ becomes positive so that output voltages V1, V2 and V3 of respective converters are increased in proportion to the value of $\epsilon T \cdot KT$ along the directions indicated by the arrows in FIG. 6. Then, circulating current Io of cycloconverter CC increases, and output currents I1, I2 and I3 of respective converters correspondingly increase so that the current sum IT = I1 + I2 + I3 also increases. By the increase of current sum IT, the control target IT = IT* is achieved from the state of IT*>IT.

When IT*<IT, error $\epsilon T$ becomes negative so that output voltages V, V2 and V3 of respective converters are decreased in proportion to the value of $\epsilon T \cdot KT$. Then, circulating current Io of cycloconverter CC decreases, and output currents I1, I2 and I3 of respective converters correspondingly decrease so that the current sum IT = I1 + I2 + I3 also decreases. By the decrease of current sum IT, the control target IT = IT* is achieved from the state of IT*<IT.

Assume here that the triggering phase angles of respective converters at a given instant are denoted by $\alpha 1$, $\alpha 2$ and $\alpha 3$. Then, reactive power Qcc at the power supply side of cycloconverter CC is given by:

$$Qcc = kQ \cdot (I1 \cdot \sin \alpha 1 + I2 \cdot \sin \alpha 2 + I3 \cdot \sin \alpha 3) \quad (25)$$

where kQ is a proportional constant. In a natural commutation operation, each of triggering phase angles $\alpha 1$, $\alpha 2$ and $\alpha 3$ varies generally within a range from 20° to 150° in synchronism with the frequency change at the load. Thus, the respective values of sin $\alpha 1$, sin $\alpha 2$ and sin $\alpha 3$ are always positive, and output currents I1, I2 and I3 and also always positive. Then, the increment of current sum IT serves to increase the amount of reactive power Qcc.

When Q*>Q, error $\epsilon Q = Q^* - Q$ becomes positive so that current sum instruction IT* from control compensator H(S) increases. Since current sum IT is controlled to approach its instruction IT*, IT in this state is increased to augment the phase-delayed reactive power Qcc of cycloconverter CC. Reactive power Q at the power supply side of cycloconverter CC may be represented as:

$$Q = Qcc - Qcap \quad (26)$$

where Qcap denotes the phase-advanced reactive power from phase advancing capacitor C and the positive sign is assigned to the advance of phase. Since the amount of Qcap is substantially fixed, the augmentation of Qcc results the increase of reactive power Q at the power supply side of cycloconverter CC. Then, the control target Q = Q* is achieved from the state of Q*>Q.

When Q*<Q, error $\epsilon Q$ becomes negative so that current sum instruction IT* decreases. Since current sum IT is controlled to approach its instruction IT*, IT in this state is decreased to diminish the phase-delayed reactive power Qcc. The diminution of Qcc results the decrease of Q, and the control target Q = Q* is achieved from the state of Q* = Q.

Figure 7:
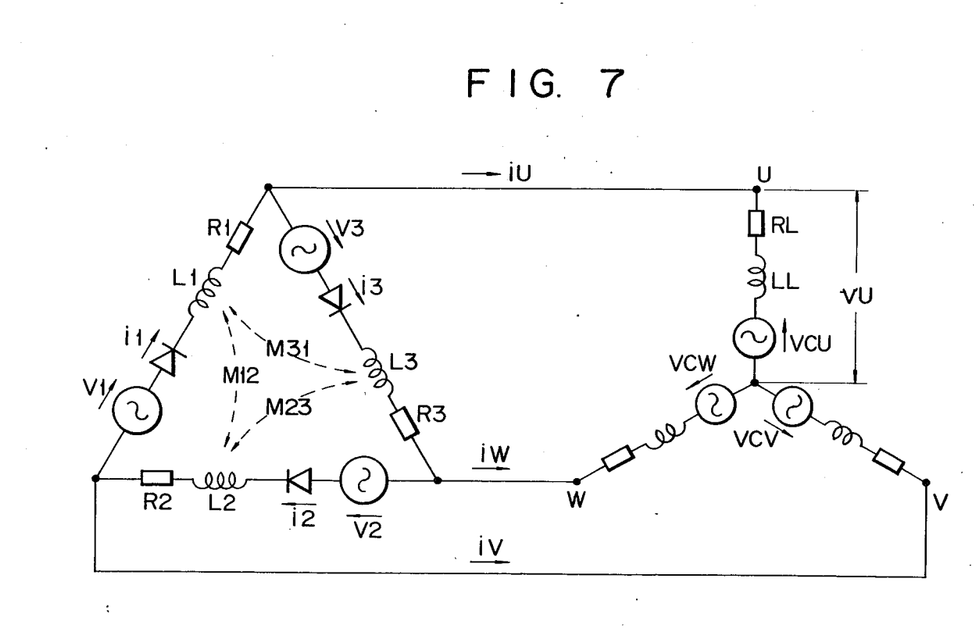
FIG 7 shows an equivalent circuit of a cycloconverter main unit and load (motor M) in FIG. 6.

FIG. 7 shows an equivalent circuit of cycloconverter main unit CC and load (motor M) in FIG. 6. In this equivalent circuit a Y-connection is applied to the load. The following equations can be obtained from this equivalent circuit:

$$V1 = (R1 + L1 \cdot p) \cdot i1 + M12 \cdot p \cdot i2 + M31 \cdot p \cdot i3 + V_{UV} \quad (27)$$

$$V2 = (R2 + L2 \cdot p) \cdot i2 + M12 \cdot p \cdot i1 + M23 \cdot p \cdot i3 + V_{VW} \quad (28)$$

$$V3 = (R3 + L3 \cdot p) \cdot i3 + M31 \cdot p \cdot i1 + M23 \cdot p \cdot i2 + V_{WU} \quad (29)$$

$$V_U = (RL + LL \cdot p) \cdot iU + V_{CU} \quad (30)$$

$$V_V = (RL + LL \cdot p) \cdot iV + V_{CV} \quad (31)$$

$$V_W = (RL + LL \cdot p) \cdot iW + V_{CW} \quad (32)$$

where R1 to R3 denote the resistances of DC reactors, L1 to L3 denote the self-inductances of DC reactors, RL denotes the resistance to one phase of the load, LL denotes the inductance of one phase of the load, and p denotes the differentiation operator. Further, $V_{CU}$, $V_{CV}$ and $V_{CW}$ denote the counter electromotive forces of the load (motor M); $V_U$, $V_V$ and $V_W$ denote phase voltages applied to the load; and $V_{UV}$, $V_{VW}$ and $V_{WU}$ denote line voltages of the load. These phase and line voltages have the following relations:

$$V_{UV} = V_U - V_V \quad (33)$$

$$V_{VW} = V_V - V_W \quad (34)$$

$$V_{WU} = V_W - V_U \quad (35)$$

Further, output currents i1, i2 and i3 of the converters and load currents iU, iV and iW have the following relations:

$$iU = i1 - i3 \quad (36)$$

$$iV = i2 - i1 \quad (37)$$

$$iW = i3 - i2 \quad (38)$$

Assume here that R1=R2=R3=R, L1=L2=L3=L, and M12=M23=M31=M. Then, the following relation is obtained by subtracting equation (29) from equation (27), provided that $V_U + V_V + V_W = 0$:

$$V1 - V3 = (R + L \cdot p)(i1 - i3) - M \cdot p(i1 - i3) + \quad (39)$$

$$2V_U - V_V - V_W$$

$$= \{R + (L - M) \cdot p\}(i1 - i3) + 3V_U$$

$$= \{R + (L - M) \cdot p\} \cdot iU + 3\{(RL + LL \cdot p) \cdot iU + V_{CU}\}$$

$$= 3[R/3 + RL + \{(L - M)/3 + LL\} \cdot p] \cdot iU + 3V_{CU}$$

Equation (39) teaches that the load current iU can be controlled according to the voltage difference (V1−V3).

In like manner, the difference of equations (28)−(27) and the difference of equations (29)−(28) provide the following relations:

$$V2 - V1 = 3[R/3 + RL + \{(L-M)/3 + LL\} \cdot p] \cdot iV + 3 V_{CV} \quad (40)$$

$$V3 - V2 = 3[R/3 + RL + \{(L-M)/3 + LL\} \cdot p] \cdot iW + 3 V_{CW} \quad (41)$$

Equation (40) teaches that the load current iV can be controlled according to the voltage difference (V2−V1), and equation (41) teaches that the load current iW can be controlled according to the voltage difference (V3−V2). The load current control operation of the embodiment in FIG. 6 is based on the relation of equations (39) to (41).

The sum of equations (27), (28) and (29) provides the following relation:

$$V1 + V2 + V3 = (R + L \cdot p)(i1 + i2 + i3) + \quad (42)$$

$$2M \cdot p(i1 + i2 + i3) + V_{UV} + V_{VW} + V_{WU}$$

$$= \{R + (L + 2M) \cdot p\}(i1 + i2 + i3)$$

Equation (42) teaches that a current sum iT=iL+i2+i3 can be controlled in accordance with the voltage sum V1+V2+V3.

As seen from equation (42), a transfer function of the current sum control depends on resistance R and inductance (L+2M) of the DC reactor, but this transfer function is free from any external disturbance. This is an important feature of the embodiment of FIG. 6.

In a conventional cycloconverter, output currents i1, i2 and i3 from respective converters are separated into components of circulating current io and load current components i1', i2' and i3', so that the following relations hold:

$$i1 = i0 + i1' \quad (43)$$

$$i2 = i0 + i2' \quad (44)$$

$$i3 = i0 + i3' \quad (45)$$

Equation (42) can be modified according to equations (43) to (45) as:

$$V1 + V2 + V3 = \{R + (L = 2M) \cdot p\}(3io + i1' + i2' + i3') \quad (46)$$

$$= \{R + (L + 2M) \cdot p\} \cdot 3io +$$

$$\{R = (L + 2M) \cdot p\}(i1' + i2' + i3')$$

Equation (46) teaches that a conventional cycloconverter controls the circulating current io in accordance with the voltage sum V1+V2+V3 which involves the term of i1', i2' and i3'. Thus, the conventional cycloconverter is subjected to the influence of disturbance ΔeL which is given as:

$$\Delta eL = \{R + (L+2M) \cdot p\}(i1' + i2' + i3') \quad (47)$$

The current sum i1'+i2'+i3' is varied with a frequency which is three times higher than the frequency of load currents. The magnitude of disturbance ΔeL is increased in proportion to the frequency of current sum i1'+i2'+i3' and also in proportion to the magnitude of load current iU, iV and IW. Disturbance Δel will put the circulating current control into disorder.

The disturbance of circulating current control causes variations in the reactive power at the power supply side of the cycloconverter and brings side-band noises around the fundamental frequency of the power supply, resulting in various ill effects.

On the contrary, according to the embodiment utilizing the relation of equation (42), the control operation is free from the disturbance ΔeL. Therefore, a control for fixing the current sum iT=i1+i2+i3, or a control for changing this current sum, in accordance with the reactive power can be optionally performed.

Incidentally, although cycloconverter main unit CC in FIG. 6 is formed of three converters SS1 to SS3, six or other proper number of serially connected converters may be used to increase the number of control pulses for the cycloconverter. An example of such a cycloconverter, which comprises six converters, is shown in FIG. 16 of U.S. patent application Ser. No. 594,917.

Figure 8:
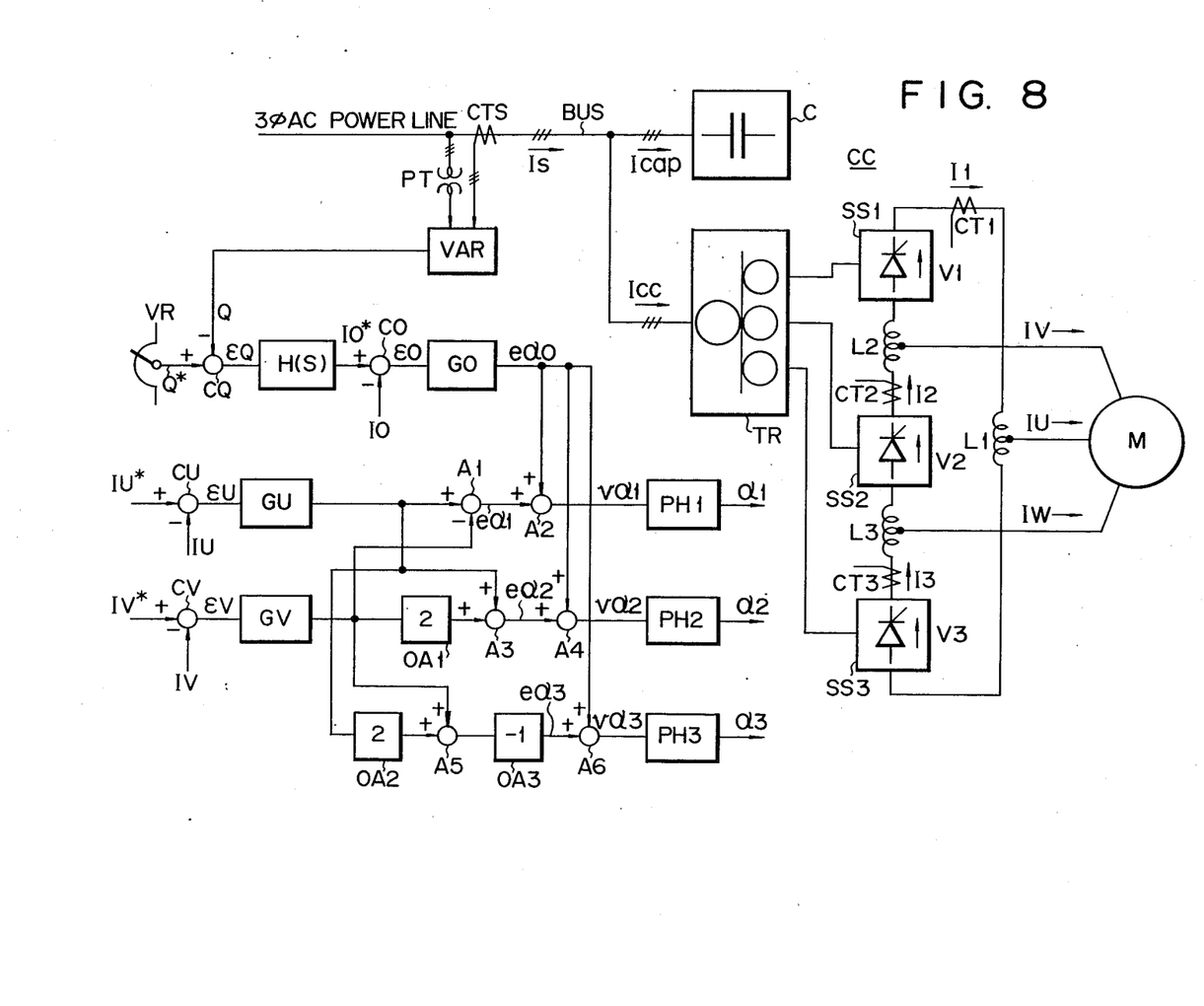
FIG. 8 shows a block diagram of a cycloconverter according to another embodiment of the present invention.

FIG. 8 shows a block diagram of a cycloconverter according to another embodiment of the present invention. In FIGS. 6 and 8, common reference symbols denote common circuit elements, thereby avoiding redundant explanation.

The embodiment of FIG. 8 includes: (a) a circuit for controlling currents IU, IV and IW supplied to 3-phase AC motor M, and (b) a circuit for controlling a circulating current Io of the cycloconverter to adjust the reactive power at the power supply side of cycloconverter CC. The main feature of this embodiment resides in the former circuit (a). Accordingly, the following description will be given chiefly to the circuit (a).

Now, description will be given first to the control operation of reactive power at the power supply side of cycloconverter CC.

The commutation for respective thyristors in power converters SS1 to SS3 of cycloconverter CC is carried out in accordance with the power supply voltage. Namely, a natural commutation is utilized. Under the natural commutation operation, the AC input current of converters SS1 to SS3 is always phase-delayed from the AC power supply voltage, thereby consuming phase-delayed reactive power. The amount of this phase-delayed reactive power depends on the magnitude of load current IU, IV and IW and on the value of triggering phase angles for the respective converters. From this, variations in the phase-delayed reactive power cause undesirable variations in the power supply voltage, resulting in adverse effect on a power supply system coupled to the cycloconverter CC. In order to remove such adverse effect, the phase-delayed reactive power is cancelled by a given phase-advanced reactive power obtained from phase advancing capacitor C. The cancelling of the reactive power is performed in a manner that the circulating current Io of cycloconverter CC is controlled so that the amount of phase-advanced reactive power becomes equal to that of phase-delayed reactive power.

When measured from the power supply side, the circulating current Io of cycloconverter CC provides phase-delayed reactive power, but the circulating current Io is independent of active power. On the other hand, load currents IU, IV and IW measured from the power supply side contain both active and reactive power components. From this, the component of reactive power measured from the power supply side can be made zero by controlling the value of circulating current Io so that the sum of the phase-delayed reactive power due to load currents IU, IV and IW and the phase delayed reactive power due to circulating current Io becomes equal to the phase-advanced reactive power due to phase advancing capacitor C. Then, the component of reactive power is cancelled and only the component of active power, which depends on the load current, remains.

The above-mentioned circulating current control for cancelling the reactive power will be carried out as follows.

In FIG. 8, the voltage and current at the power supply side of cycloconverter CC are respectively detected via PT and CTS, and reactive power Q at the power supply side is obtained from reactive power arithmetic circuit VAR according to the detected voltage and current. Reactive power instruction Q* from reactive power setting potentiometer VR and the above reactive power Q are supplied to comparator CQ. Comparator CQ provides error $\epsilon Q = Q^* - Q$. Error $\epsilon Q$ is converted via control compensator H(S) to circulating current instruction Io*. Instruction Io* is supplied to comparator C0 which also receives a detected circulating current Io. Detected circulating current Io is obtained from the detector of FIG. 5. Comparator C0 provides error $\epsilon 0 = Io^* - Io$. Error $\epsilon 0$ is converted via a current control compensator Go to a control signal $e\alpha 0$. Control signal $e\alpha 0$ is supplied to phase control circuits PH1, PH2 and PH3 via adders A2, A4 and A6, respectively.

When $Q^* > Q$, error $\epsilon Q = Q^* - Q$ becomes positive so that circulating current instruction Io* increases. Then, Io*>Io is established so that output voltages V1, V2 and V3 of respective converters are increased toward the direction as indicated by arrows according to the value of positive error $\epsilon 0 > 0$. From this, the voltage sum V1+V2+V3 (>0) is increased and the increased voltage sum is applied to the series circuit of DC reactors L1, L2 and L3, so that the circulating current Io of cycloconverter CC increases until the control target Io=Io* is obtained. The increase of circulating current Io causes to augment the amount of phase-delayed reactive power Q at the power supply side of cycloconverter CC. Then, Q=Q* is obtained.

When $Q^* < Q$, error $\epsilon Q = Q^* - Q$ becomes negative so that circulating current instruction Io* decreases. Then, Io*>Io is established so that output voltages V1, V2 and V3 of respective converters are decreased according to the value of negative error $\epsilon 0 < 0$. From this, the voltage sum V1+V2+V3 (<0) is decreased so that the circulating current Io decreases until the control target Io=Io* is obtained. The decrease of circulating current Io causes to diminish the amount of phase-delayed reactive power Q at the power supply side of cycloconverter CC. Then, Q=Q* is obtained.

Generally speaking, the reactive power instruction Q* is set to be zero so that Q=Q*=0 is obtained by the control operation. In this case, the power factor of the fundamental wave at the power supply side of cycloconverter CC is controlled to be "1".

Incidentally, further details regarding the above reactive power control are given in the specification of Japanese Patent Application No. 56-158,692 or U.S. patent application Ser. No. 594,917.

The load current control operation of FIG. 8 embodiment will be as follows.

Output currents I1, I2 and I3 from converters SS1, SS2 and SS3 are detected by current transformers CT1, CT2 and CT3. These currents I1, I2 and I3 and the load currents IU, IV and IW have the following relations:

$$IU = I1 - I3 \quad (48)$$

$$IV = I2 - I1 \quad (49)$$

$$IW = I3 - I2 \quad (50)$$

Equations (48) to (50) hold independently of the flow of circulating current Io. Thus, load currents IU, IV and IW may be obtained from output currents I1, I2 and I3 in accordance with the relation of equations (48) to (50). Or, load currents IU, IV and IW may be obtained directly from proper current transformers (not shown).

Comparator CU compares the load current IU with its instruction IU*, and comparator CV compares the load current IV with its instruction IV*. Then, the following errors $\epsilon U$ and $\epsilon V$ are obtained respectively from comparators CU and CV:

$$\epsilon U = IU^* - IU \quad (51)$$

$$\epsilon V = IV^* - IV \quad (52)$$

Error $\epsilon U$ is supplied via current control compensator GU to each positive input of adders A1 and A3, and is further via an operational amplifier OA2 to the positive input of adder A5. Error $\epsilon V$ is supplied via current control comparator GV to the negative input of adder A1 and to the positive input of adder A5, and is further via an operational amplifier OA1 to the positive input of adder A3. An output from adder A5 is phase-inverted via an inverting amplifier OA3. In the embodiment of FIG. 8, the gains of amplifiers OA1, OA2 and OA3 are set to be 2, 2 and $-1$, respectively. Then, the following control signals $e\alpha1$, $e\alpha2$ and $e\alpha3$ are obtained from adder A1, adder A3 and amplifier OA3, respectively:

$$e\alpha1 = GU \cdot \epsilon U - GV \cdot \epsilon V \quad (53)$$

$$e\alpha2 = GU \cdot \epsilon U + GV \cdot 2\epsilon V \quad (54)$$

$$e\alpha3 = -GU \cdot 2\epsilon U - GV \cdot \epsilon V \quad (55)$$

when the transfer function of each of current control compensators GU, GV and GW is set to be G(S), the following the relation is obtained:

$$GU = GV = GW = G(S) \quad (56)$$

From equation (56), equations (53) to (55) can be modified as follows:

$$e\alpha1 = (\epsilon U - \epsilon V) \cdot G(S) \quad (57)$$

$$e\alpha2 = (\epsilon U + 2\epsilon V) \cdot G(S) \quad (58)$$

$$e\alpha3 = -(2\epsilon U + \epsilon V) \cdot G(S) \quad (59)$$

Each of control signals $e\alpha1$, $e\alpha2$ and $e\alpha3$ is added to control signal $e\alpha0 = \epsilon0 \cdot Go$ from compensator Go in each of adders A2, A4 and A6. The added results $v\alpha1$, $v\alpha2$ and $v\alpha3$ from adders A2, A4 and A6 are supplied to phase control circuits PH1, PH2 and PH3, respectively.

In the following description, for the sake of simplicity, it is assumed that error $\epsilon0 = Io^* - Io$ is zero so that $Q = Q^*$, or error $\epsilon0$ is negligibly small ($\epsilon0 \approx 0$). Namely, $e\alpha0 \approx 0$ is assumed here.

When IU* > IU under the condition that IV* = IV ($\epsilon V = 0$), error $\epsilon U = IU^* - IU$ becomes positive so that $e\alpha1 = \epsilon U \cdot G(S)$ is applied via control compensator GU to phase control circuit PH1. Phase control circuit PH2 receives $e\alpha2 = \epsilon U \cdot G(S) = e\alpha1$, and phase control circuit PH3 receives $e\alpha3 = -2\epsilon U \cdot G(S) = -2e\alpha1$. Output voltages V1, V2 and V3 from respective converters of cycloconverter CC become specific voltage values which are proportional to $v\alpha1 = e\alpha1$, $v\alpha2 = e\alpha2$ and $v\alpha3 = e\alpha3$.

Regarding the cycloconverter and load, the equivalent circuit of FIG. 2 may be applied to the embodiment of FIG. 8. Accordingly, the following explanation will be based on the equivalent circuit of FIG. 2.

Output voltage V1 from converter SS1 and output voltage V2 from converter SS2 are both increased in proportion to error $\epsilon U = IU^* - IU$, while output voltage V3 from converter SS3 is decreased in proportion to two times of error $\epsilon U$. Thus, currents Ia and Ib in FIG. 2 increase in proportion to $\epsilon U$ and current Ic decreases in proportion to $-2\epsilon U$.

In the equivalent circuit of FIG. 2, the load currents (line currents) IU, IV and IW and the phase currents Ia, Ib and Ic have the following relations:

$$IU = Ia - Ic \quad (60)$$

$$IV = Ib - Ia \quad (61)$$

$$IW = Ic - Ib \quad (62)$$

Equations (60) to (62) hold independently of circulating current Io flowing through the delta-connected load. Since currents Ia and Ib increase in proportion to $\epsilon U$ and current Ic decreases in proportion to $-2\epsilon U$ as mentioned above; IU increases in proportion to $3\epsilon U$, IV is fixed and IW decreases in proportion to $-3\epsilon U$. Namely, when IU* > IU, load current IU is actually increased according to error $\epsilon U = IU^* - IU$ so that the control target IU* = IU is achieved. In this case, since the power is supplied via 3-phase 3-line power transmission, the increment of IU causes the decrement (or increment in a negative direction) of IW, so that the following relation holds:

$$IU + IV + IW = 0 \quad (63)$$

When IU* < IU under the condition that IV* = IV, error $\epsilon U = IU^* - IU$ becomes negative, and load current IU is controlled to decrease in proportion to error $\epsilon U$ so that the control target IU* = IU is achieved.

When IV* > IV under the condition that IU* = IU ($\epsilon U = 0$), error $\epsilon V = IV^* - IV$ becomes positive so that $e\alpha1 = -\epsilon V \cdot G(S)$ is applied via control compensator GV to phase control circuit PH1. Phase control circuit PH2 receives $e\alpha2 = 2\epsilon V \cdot G(S)$, and phase control circuit PH3 receives $e\alpha3 = -\epsilon V \cdot G(S) = e\alpha1$. Output voltages V1, V2 and V3 from respective converters of cycloconverter CC become specific voltage values which are proportional to $v\alpha1 = e\alpha1$, $v\alpha2 = e\alpha2$ and $v\alpha3 = e\alpha3$. Currents Ia and Ic in FIG. 2 decrease in proportion to $-\epsilon V$, while current Ib increases in proportion to $2\epsilon V$. Accordingly, from equations (60) to (62), IU is fixed, IV is increased in proportion to $3\epsilon V$, and IW is decreased in proportion to $-3\epsilon V$. Namely, when IV* > IV, load current IV is actually increased according to error $\epsilon V = IV^* - IV$ so that the control target IV* = IV is achieved. In this case, the increment of IV causes the decrement (or increment in a direction being opposite to the arrow) of IW, so that equation (63) holds.

When IV* < IV under the condition that IU* = IU, error $\epsilon V = IV^* - IV$ becomes negative, and load current IV is controlled to decrease in proportion to error $\epsilon V$ so that the control target IV* = IV is achieved.

Similar control is performed in case where IU* $\neq$ IU and IV* $\neq$ IV, and a steady state of IU* = IU and IV* = IV is obtained. In these cases, W phase current IW flows under the condition of equation (63), so that $IW = -IU - IV = -IU^* - IV^*$ is established.

The embodiment of FIG. 8 is chiefly characterized by the control based on equations (60) to (62). That is, the said equations (1) to (3) do not hold when circulating current Io flows in the delta-connected load as shown by the equivalent circuit of FIG. 2. On the contrary, since equations (60) to (62) hold independently of circulating current Io, the load current control operation of FIG. 8 embodiment is accurate.

The present invention can be applicable not only to a circulating current type cycloconverter but also to a non-circulating current type cycloconverter. Further, the number of control pulses for triggering the thyristors of respective converters in cycloconverter CC may be optionally selected (e.g., 3 pulses, 6 pulses, 12 pulses and so on).

The advantages obtained from the embodiment of FIG. 6 are as follows:

(i) Since the sum of output currents from converters is used for controlling the reactive power at the power supply side of cycloconverter CC, a means for detecting the circulating current is not required. From this, a practicable cycloconverter can be manufactured with relatively low cost; and (ii) Since the control does not depend on the circulating current which is liable to be affected by external disturbance, a highly reliable cycloconverter can be obtained. To be concrete, variations in reactive power due to the disturbance can be made negligible, thereby avoiding adverse effect on a power supply system coupled to the cycloconverter.

The advantages obtained from the embodiment of FIG. 8 are as follows:

(i) Load currents can be controlled directly; and (ii) Since the currents of two phases (e.g., IU and IV) of the 3-phase AC power are simultaneously controlled, the current of the remaining one phase is automatically controlled so as to satisfy the equation (63). From this, a stable cycloconverter which is substantially free from mutual interference among control circuits can be obtained.

Finally, all disclosures of the following U.S. patents are incorporated in the present application in order to provide information of the state of the art:

(1) U.S. Pat. No. 4,418,380 issued on Nov. 29, 1983 (Tanaka et al.); and (2) U.S. Pat. No. 4,013,937 issued on Mar. 22, 1977 (Pelly et al.).

What is claimed is:

1. A cycloconverter apparatus comprising:
   at least three sets of power converters coupled to a load and to an AC power supply, said power converters being connected in a delta fashion to form a circulating current type cycloconverter;
   load current control means coupled to said power converters for generating load current control signals which correspond to load currents flowing through said load;
   reactive power control means coupled to said AC power supply for detecting reactive power at the AC power supply side of said power converters to generate a reactive power control signal;
   current sum control means coupled to said power converters and to said reactive power control means for detecting respective output currents from said power converters and generating a current sum control signal which corresponds to the sum of said output currents and to said reactive power control signal; and
   phase control means coupled to said load current control means, to said current sum control means and to said power converters, for controlling the triggering phase of each of said power converters in accordance with said load current control signals and said current sum control signal.

2. A cycloconverter apparatus according to claim 1, wherein said cycloconverter is provided with a phase advancing capacitor for supplying a phase-advanced reactive power to said AC power supply,
   and wherein said cycloconverter supplies a phase-delayed reactive power to said AC power supply in accordance with said current sum control signal in a manner that said phase-advanced reactive power substantially cancels said phase-delayed reactive power.

3. A cycloconverter apparatus according to claim 1, wherein said current sum control means includes:
   a current sum comparator for comparing said reactive power control signal with a current sum detected signal which represents the sum of said output currents, and providing a current sum difference signal which corresponds to the difference between said reactive power control signal and said current sum detected signal; and
   a current sum control compensator coupled to said current sum comparator and having a given transfer function, for converting said current sum difference signal in accordance with said given transfer function into said current sum control signal.

4. A cycloconverter apparatus according to claim 3, wherein said reactive power control means includes:
   a reactive power detector for detecting the voltage and current of said AC power supply and generating a reactive power signal;
   a reactive power comparator coupled to said reactive power detector and being responsive to a reactive power instruction signal, for comparing said reactive power signal with said reactive power instruction signal and providing a reactive power difference signal which corresponds to the difference between said reactive power instruction signal and said reactive power signal; and
   a reactive power control compensator coupled to said reactive power comparator and having a prescribed transfer function, for converting said reactive power difference signal in accordance with said prescribed transfer function into said reactive power control signal.

5. A cycloconverter apparatus according to any one of claims 1 to 4, wherein said load current control means includes:
   a first load current comparator for comparing a first load current instruction signal with a first signal corresponding to first one of said load currents and providing a first load current difference signal;
   a second load current comparator for comparing a second load current instruction signal with a second signal correspnding to second one of said load currents and providing a second load current difference signal;
   a third load current comparator for comparing a third load current instruction signal with a third signal corresponding to third one of said load currents and providing a third load current difference signal;
   a first circuit coupled to said first and second load current comparators for generating first one of said load current control signals in accordance with the difference between said first and second load current difference signals;
   a second circuit coupled to said second and third load current comparators for generating second one of said load current control signals in accordance with the difference between said second and third load current difference signals; and a third circuit coupled to said third and first load current comparators for generating third one of said load current control signals in accordance with the difference between said third and first load current difference signals.

6. A cycloconverter apparatus according to claim 5, wherein said phase control means includes:
   a first phase control circuit coupled to said first circuit for controlling the triggering phase of first one of said power converters in accordance with said current sum control signal and the first one of said load current control signals;
   a second phase control circuit coupled to said second circuit for controlling the triggering phase of second one of said power converters in accordance with said current sum control signal and the second one of said load current control signals; and
   a third phase control circuit coupled to said third circuit for controlling the triggering phase of third one of said power converters in accordance with said current sum control signal and the third one of said load current control signals.

7. A cycloconverter apparatus comprising:
   first, second and third power converters coupled to an AC power supply and being connected in a delta fashion to form a circulating current type cycloconverter; said first, second and third power converters being coupled to a 3-phase load so that the relations:

$$IU = I1 - I3$$

$$IV = I2 - I1$$

$$IW = I3 - I2$$

are substantially established; wherein IU, IV and IW denote load currents respectively supplied to said 3-phase load, and I1, I2 and I3 denote output currents respectively from said first, second and third power converters;
   first comparator means for comparing a first load current instruction signal with a first current signal corresponding to said load current IU, and providing a first difference signal $\epsilon U$ which corresponds to the difference between said first load current instruction signal and said first current signal;
   second comparator means for comparing a second load current instruction signal with a second current signal corresponding to said load current IV, and providing a second difference signal $\epsilon V$ which corresponds to the difference between said second load current instruction signal and said second current signal; and
   output control means coupled to said first and second comparator means and to said first to third power converters, for controlling the triggering phase of said first to third power converters in a manner that the output voltage of said first power converter is controlled in accordance with a difference $\epsilon U - \epsilon V$ between said first difference signal $\epsilon U$ and said second difference signal $\epsilon V$, that the output voltage of said second power converter is controlled in accordance with a sum $\epsilon U + 2\epsilon V$ of said first difference signal $\epsilon U$ and the double of said second difference signal $\epsilon V$, and that the output voltage of said third power converter is controlled in accordance with a negative sum $-(2\epsilon U + \epsilon V)$ of the double of said first difference signal $\epsilon U$ and said second difference signal $\epsilon V$.

8. A cycloconverter apparatus according to claim 7, further comprising:
   reactive power control means coupled to said AC power supply for detecting reactive power at the AC power supply side of said power converters to generate a reactive power control signal; and
   circulating current control means coupled to said output control means and to said reactive power control means for generating a circulating current control signal which corresponds to the difference between said reactive power control signal and a circulating current signal corresponding to the magnitude of a circulating current which flows through said first to third power converters.

9. A cycloconverter apparatus according to claim 7, wherein said output control means includes:
   first circuit means coupled to said first and second comparator means for generating a first control signal which corresponds to said difference $\epsilon U - \epsilon V$;
   second circuit means coupled to said first and second comparator means for generating a second control signal which corresponds to said sum $\epsilon U + 2\epsilon V$;
   third circuit means coupled to said first and second comparator means for generating a third control signal which corresponds to said negative sum $-(2\epsilon U + \epsilon V)$;
   first phase control means coupled to said first circuit means for controlling the triggering phase of said first power converter in accordance with said first control signal;
   second phase control means coupled to said second circuit means for controlling the triggering phase of said second power converter in accordance with said second control signal; and
   third phase control means coupled to said third circuit means for controlling the triggering phase of said third power converter in accordance with said third control signal.

10. A cycloconverter apparatus according to claim 8, wherein said output control means includes:
   first circuit means coupled to said first and second comparator means for generating a first control signal which corresponds to said difference $\epsilon U - \epsilon V$;
   second circuit means coupled to said first and second comparator means for generating a second control signal which corresponds to said sum $\epsilon U + 2\epsilon V$;
   third circuit means coupled to said first and second comparator means for generating a third control signal which corresponds to said negative sum $-(2\epsilon U + \epsilon V)$;
   first phase control means coupled to said first circuit means and to said circulating current control means, for controlling the triggering phase of said first power converter in accordance with said first control signal and said current sum control signal;
   second phase control means coupled to said second circuit means and to said circulating current control means, for controlling the triggering phase of said second power converter in accordance with said second control signal and said current sum control signal; and
   third phase control means coupled to said third circuit means and to said circulating current control means, for controlling the triggering phase of said third power converter in accordance with said third control signal and said current sum control signal.

11. A cycloconverter apparatus according to claim 8 or 10, wherein said cycloconverter is provided with a phase advancing capacitor for supplying a phase-advanced reactive power to said AC power supply, and wherein said cycloconverter supplies a phase-delayed reactive power to said AC power supply in accordance with said circulating current control signal in a manner that said phase-advanced reactive power substantially cancels said phase-delayed reactive power.

* * * * *